May 3, 1938. H. H. HARRIS 2,115,769
RADIANT HEATING TUBE
Filed Aug. 22, 1936
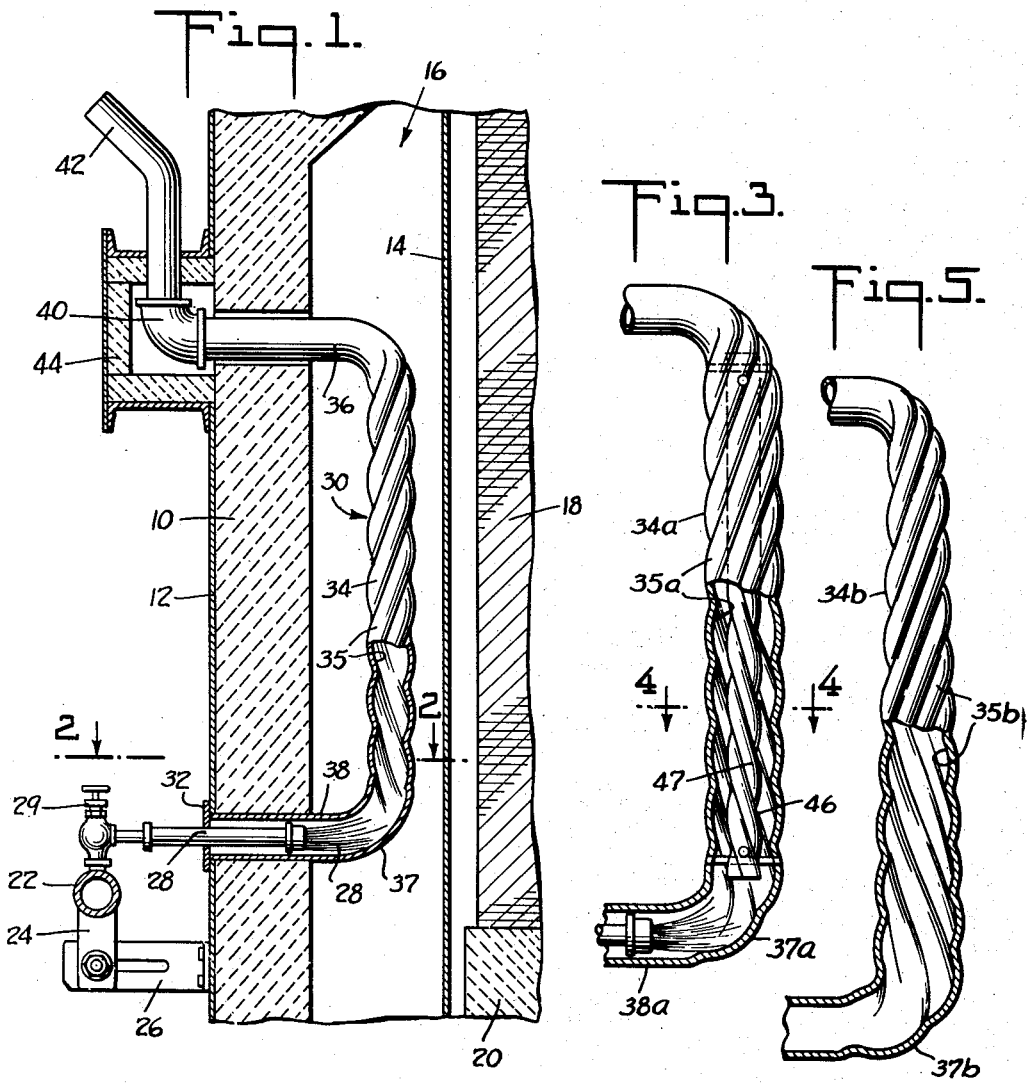
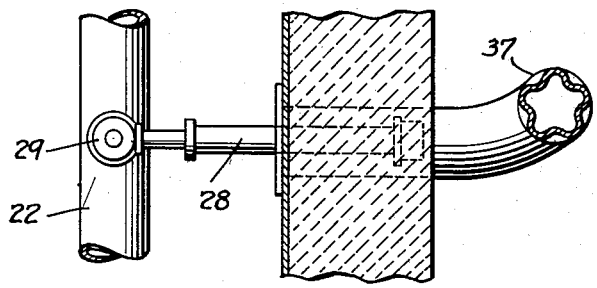
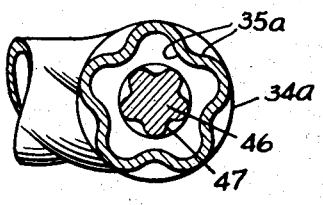
INVENTOR
HENRY H. HARRIS
BY
Dyke and Schaires
ATTORNEYS Patented May 3, 1938

2,115,769

UNITED STATES PATENT OFFICE 2,115,769

RADIANT HEATING TUBE

Henry H. Harris, Champaign, Ill.

Application August 22, 1936, Serial No. 97,340

7 Claims. (Cl. 126—91)

This invention relates to radiant heating tubes, particularly for annealing furnaces.

It is an object of this invention to provide a radiant heating tube, particularly for use in annealing furnaces, which will give a greater heat liberation for a given heat input and a given length of tube.

It is a further object to provide a tube which will give more thorough combustion of the fuel as it passes through the tube.

A further object is to provide a tube which will give a more uniform heat liberation throughout its length.

Further objects will become apparent during the course of the specification.

In the drawing,

Fig. 1 is a vertical sectional view of a tube in accordance with my invention, showing same in association with a portion of the housing and fittings of an annealing furnace;

Fig. 2 is a horizontal section taken on the line 2—2 of Fig. 1;

Fig. 3 is a side elevation, partially in section, of a second form of my invention;

Fig. 4 is a horizontal section on the line 4—4 of Fig. 3; and

Fig. 5 is a side elevation, partially in section, of a third form of my invention.

Radiant heating tubes such as herein disclosed are generally arranged in two rows along opposite walls of a furnace chamber. As such furnaces are well known, I have not shown the complete assembly, but have indicated enough to afford an understanding of my invention.

Having particular reference to Figs. 1 and 2, reference character 10 designates an insulation wall of the furnace, with an outer cover plate 12. An inner heat conductive plate 14 is preferably interposed between the tube chamber 16 and the charge 18 on the platform or other support 20.

A manifold 22, carried on supports 24, 26, supplies mixed fuel to any desired number of combustion jets 28 controlled by valves 29. Each burner jet extends into a heating tube 30, whose end is sealed as by a cap 32 about the jet. These heating tubes are preferably cast, and made of a high heat resisting alloy.

Each heating tube is formed with a longitudinal tubular central portion 34 and transverse tubular end portions 36, 38. These end portions extend out through the insulation wall 10 and cover plate 12, disposing the main central portion 34 of the tube vertically between the wall 10 and the heat conductive plate 14.

Where the upper end portion 36 extends out through the wall 10 an elbow or other fitting 40 secures an exhaust pipe 42 thereto, and an insulated cover box 44 surrounds the joints and the opening through the wall.

Each heating tube 30 is shaped to cause the burning gases to swirl as they pass therethrough.

In the form of Figs. 1 and 2, the longitudinal central portion 34 of the tube is formed with spiral corrugations 35, which correspond on the interior and exterior, the thickness of the walls being substantially uniform throughout, and the elbow bend 37 between the central portion 34 and the lower transverse portion 38 is preferably offset as shown at 37, Fig. 2. This offset is to the side which will start the gases rotating in the same direction as the spiral grooves in the longitudinal central portion.

Thus when the burning gases from the jet 28 reach the bend 37 they are diverted upwardly, as seen in Fig. 1, and also diverted to the left, as seen in Fig. 2. This imparts to them an initial rotation which is continued not only by momentum but also by the spiral grooves 35.

Thus the burning gases are whirled and eddied, whereby combustion is more complete and efficient. Moreover, the burning gases are thrown into more intimate contact with the walls of the radiant heating tube, both because of centrifugal force and because of the longer path which they traverse in following the spiral. The tube also has a greater surface exposed to the gases because of its spirally corrugated form, and likewise a greater outside surface for radiating heat. Thus with my invention there is improvement in the combustion of the gases, in the transfer of their heat to the tube, and in the radiating of heat by the tube.

In Figs. 3 and 4 I have shown a modified form of heating tube in accordance with my invention, in which the longitudinal central portion 34a of the tube is provided with spiral corrugations 35a, and the bend 37a between the central portion 34a and the bottom transverse portion 38a is not offset but is provided with continuations of the spiral corrugations, so that the burning gases impinge upon the beginnings of the spiral corrugations as they issue from the jet.

In these figures I have also shown another feature which may be used with any of the forms of tube in accordance with my invention. A preferably solid core 46 is positioned axially of the central portion 34a of the tube. The outer surface of this core is provided with corrugations 47 which spiral in the opposite direction from those of the tube itself. As a result the gases rotate in the direction of the spirals in the tube as they pass up through the tube, while the opposite spirals on the core partially break up and reverse the swirl of the gases, creating a turbulence which more thoroughly mixes the gases and causes them to eddy. Thereby all the particles of the gases are assured of repeated contact with the surface of the heating tube, whereby the heat of the gases is more thoroughly transferred to the tube for radiation thereby.

In Fig. 5 I have shown a third modification, having spiral corrugations 35b which start below the bend 37b and continue throughout the central portion 34b, in which the diameter of the tube is reduced progressively from the bottom of central portion 34b to the top thereof. As a result, the proportion of surface area to enclosed volume is increased, and the speed of flow of the gases is also increased. The gases cool off toward the top, having given off some of their heat at the lower part of the tube. These cooler gases are with this tapered tube sent through faster and in contact with surface area which is greater in proportion to the thickness of the stream of gases. Thus these cooler gases are caused to give off their heat more rapidly, and the upper part of the heating tube is as hot as the lower part, thereby giving uniform heating.

It will be understood, of course, that variations and changes may be made within the scope of my invention, and the several features may be used independently or in various combinations, as for example, the core shown in Fig. 3 may be used with the forms of tubes shown in either Figs. 1 and 2 or Fig. 5, as well as with the form of tube shown in Figs. 3 and 4.

I claim:

1. A heating tube having a principal longitudinal portion provided with interior spiral corrugations, and having a transversely extending entrance end portion provided with oblique deflecting means angled in the same rotational direction as the spiral corrugations of the principal longitudinal portion.

2. A heating tube having a principal longitudinal portion provided with interior spiral corrugations, and having a transversely extending entrance end portion, said end portion having oblique deflecting means, and said interior spiral corrugations extending around the bend between the principal portion and the end portion.

3. A heating tube having a principal longitudinal portion provided with interior oblique deflecting means, and having a transversely extending entrance end portion, said end portion being offset with respect to said principal portion to the side which imparts to entering gases a spiral rotation in the same direction as the oblique deflecting means in the principal longitudinal portion.

4. A heating tube comprising a principal longitudinally extending portion having interior spiral corrugations and having an outlet, a transverse tubular entrance member, a burner jet therein, and an offset elbow connection between the transverse and elongated tubes, the offset and the spiral corrugations being arranged to cause gases travelling through to swirl in the same rotative sense.

5. A heating tube having spiral corrugations in its inner surface and a core within said tube, said core having spiral corrugations on its outer surface, the spiral corrugations on said core running in the reverse direction from those in the tube.

6. A heating tube having longitudinal spiral corrugations and having an entrance end, said tube decreasing gradually in diameter as it extends farther away from its entrance end.

7. In a heat treating furnace, a radiant heating tube having a principal longitudinal portion, oblique deflecting means within said portion, a transverse entrance end portion, a burner nozzle within said end portion for directing burning gases to impinge upon the bend between said end portion and said longitudinal portion, and oblique deflecting means at the said bend upon which said gases impinge, said deflecting means at the bend imparting rotation in the same rotational direction as said deflecting means in the longitudinal portion.

HENRY H. HARRIS.